(12) United States Patent
Mao et al.

(10) Patent No.: US 10,091,627 B2
(45) Date of Patent: Oct. 2, 2018

(54) TEXT MESSAGE HANDSHAKING AND INTEGRATION

(75) Inventors: Yong Gang Mao, Beijing (CN); Shang Tao Zhou, Beijing (CN); Dong Dong Guo, Beijing (CN); Gleb Kholodov, Seattle, WA (US); Giok Hong Khoo, Beijing (CN); Yu Xiang Li, Beijing (CN); Ning Wang, Beijing (CN); Dong Hui Zhang, Beijing (CN); Yi Zhang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 752 days.

(21) Appl. No.: 12/729,525

(22) Filed: Mar. 23, 2010

(65) Prior Publication Data

US 2011/0238732 A1 Sep. 29, 2011

(51) Int. Cl.
  *G06F 15/16* (2006.01)
  *H04W 4/18* (2009.01)

(52) U.S. Cl.
  CPC .................................... *H04W 4/18* (2013.01)

(58) Field of Classification Search
  CPC ...................................................... G06F 15/16
  USPC ................................................. 709/206, 232
  See application file for complete search history.

(56) References Cited

U.S. PATENT DOCUMENTS

| | | | | |
|---|---|---|---|---|
| 6,092,114 A * | 7/2000 | Shaffer et al. | ................. | 709/232 |
| 7,228,333 B1 | 6/2007 | Smith | ........................... | 709/206 |
| 7,366,183 B1 | 4/2008 | Sylvain | .................... | 370/395.61 |
| 8,185,644 B2 * | 5/2012 | Simon et al. | ................. | 709/229 |
| 8,571,524 B2 * | 10/2013 | Atarius | ....................... | 455/412.1 |
| 2002/0019848 A1 * | 2/2002 | Sugawara et al. | ............ | 709/206 |
| 2003/0231207 A1 | 12/2003 | Huang | ........................... | 715/752 |
| 2004/0019695 A1 * | 1/2004 | Fellenstein et al. | .......... | 709/239 |
| 2004/0267876 A1 | 12/2004 | Kakivaya et al. | ............ | 709/200 |
| 2005/0091318 A1 * | 4/2005 | Keohane et al. | ............. | 709/206 |
| 2005/0198168 A1 | 9/2005 | Marston et al. | .............. | 709/206 |
| 2007/0136431 A1 * | 6/2007 | Sun | ............................... | 709/206 |
| 2008/0114881 A1 | 5/2008 | Lee et al. | ....................... | 709/227 |
| 2009/0028305 A1 | 1/2009 | Hameed et al. | ............ | 379/93.01 |
| 2009/0168778 A1 | 7/2009 | Ahmed et al. | ................ | 370/392 |
| 2009/0197622 A1 * | 8/2009 | Atarius | ......................... | 455/466 |
| 2009/0234922 A1 * | 9/2009 | Appelman | .................... | 709/206 |
| 2009/0265438 A1 * | 10/2009 | Podl | .................... | G06Q 10/107 |
| | | | | 709/206 |
| 2010/0049816 A1 * | 2/2010 | Zellner et al. | ................ | 709/206 |

(Continued)

OTHER PUBLICATIONS

Gurbani, V., et al.; *"A Systematic Approach for Closer Integration of Cellular and Internet Services"*; Illinois Institute of Technology, Lucent Technologies, Inc./Bell Laboratories; IEEE Network; Jan./Feb. 2005; 7 pgs.

(Continued)

*Primary Examiner* — John B Walsh (74) *Attorney, Agent, or Firm* — Merchant & Gould (57) ABSTRACT

Message handshaking and integration may be provided. A message may be created by a client in a first format. The client may determine whether a server in communication with the client is operable to deliver the message in a second format. If so, the client may provide the message, in the first format, to the server for delivering to at least one recipient in the second format.

20 Claims, 6 Drawing Sheets

(56) References Cited

U.S. PATENT DOCUMENTS

2012/0191787 A1\* 7/2012 Huang .............. H04L 29/12613
709/206

OTHER PUBLICATIONS

Wen, C., et al.; "*Portable Runtime Support for Asynchronous Simulation*"; Computer Science Division, University of California; International Conference on Parallel Processing; 1995; 10 pgs.
Wikipedia; "*SMS gateway*"; http://en.wikipedia.org/wild/SMS_gateway; Dec. 8, 2009; 4 pgs.

\* cited by examiner

```xml
<?xml version="1.0" encoding="utf-16"?>
<BatchData BatchID="GUID">
<xmsData ID="INT" client="Mail Client v1.1" xmlns = "http://schemas.microsoft.com/office/Outlook/2006/OMS">
  <user>
    <userId>myname</userId>
    <password>mypwd</password>
    <replyPhone>12125551234</replyPhone>
    <customData/>
  </user>
  <xmsHead>
    <scheduled>2005-04-20T14:20:00Z</scheduled>
    <requiredService>SMS_SENDER</requiredService>
    <to>
      <recipient>135xxxx</recipient>
      <recipient>139xxxx</recipient>
    </to>
  </xmsHead>
  <xmsBody format="SMS">
    <content contentType="text/plain" contentId="Att0.txt@AB1B43B2B0594564.B94EF7ABB12B49BA"
        contentLocation="1.txt">(1/2)This is the first SMS message...</content>
    <content contentType="text/plain" contentId="Att1.txt@AB1B43B2B0594564.B94EF7ABB12B49BA"
        contentLocation="2.txt">(2/2)This is the second SMS message...</content>
  </xmsBody>
</xmsData>
<xmsData ID="INT" client=" Mail Client v1.1" xmlns = "http://schemas.microsoft.com/office/Outlook/2006/OMS">
  <user>
    <userId>myname</userId>
    <password>mypwd</password>
    <replyPhone>12125551234</replyPhone>
    <customData/>
  </user>
  <xmsHead>
    <scheduled>2005-04-20T14:20:00Z</scheduled>
    <requiredService>SMS_SENDER</requiredService>
    <to>
      <recipient>140xxxx</recipient>
      <recipient>141xxxx</recipient>
    </to>
  </xmsHead>
  <xmsBody format="SMS">
    <content contentType="text/plain" contented="Att0.txt@AB1B43B2B0594564.B94EF7ABB12B49BA"
        contentLocation="1.txt">(1/2)This is the first SMS message...</content>
    <content contentType="text/plain" contented="Att1.txt@AB1B43B2B0594564.B94EF7ABB12B49BA"
        contentLocation="2.txt">(2/2)This is the second SMS message...</content>
  </xmsBody>
</xmsData>
</BatchData>
```

TEXT MESSAGE HANDSHAKING AND INTEGRATION

BACKGROUND

Message handshaking and integration is a process for allowing a client device to create a message in one format for delivery in another format. In some situations, users may desire text messaging (i.e. short message service (SMS) communication) integrated into an e-mail application. However, traditional client-server e-mail systems are not designed to allow wholly different delivery mechanisms. This causes problems when users want to create a message in an e-mail client but have the message delivered as an SMS message.

Furthermore, processing delivery of a series of individual messages from the client to the server may require a great deal of overhead. For example, an alert service client may need to send out several hundred messages when an event occurs. In conventional systems, the client may need to create each message, open a connection to the server, send the message, and close the connection for each message individually. Thus a way to integrate multiple messages into a single client-server communication is needed.

SUMMARY

Message handshaking and integration may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Message handshaking and integration may be provided. A message may be created by a client in a first format. The client may determine whether a server in communication with the client is operable to deliver the message in a second format. If so, the client may provide the message, in the first format, to the server for delivering to at least one recipient in the second format.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 3B shows an example XML file that may be used to enumerate the messages for delivery in the file;

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Message handshaking and integration may be provided. Text messaging, or short message service (SMS), has become extremely popular globally and users now desire text messaging support built into e-mail applications. Consistent with embodiments of the invention, client devices, such as cellular phones, may be used to compose a message, either as an e-mail or an SMS message. The device may connect to a server that may deliver the message in either format. That is, the user may compose a message as an e-mail for the server to deliver to a recipient as a text message. The server may, for example, be in communication with one or more cellular network carriers and may thus convert the e-mail message to an SMS and relay the message to the carrier for delivery. The mechanism for instructing the server may be client-independent by including the address type in the message header. For example, an e-mail message may comprise a header of "MOBILE: 2125555555", indicating that the email should be delivered to a mobile user associated with the phone number (212)-555-5555. In this way, any client capable of composing a message may provide the message to the server with the "MOBILE" header and have the message delivered as a text message.

Message bundling integration may also be provided. Sending a single text message to the server in one XML can be very slow when there are many messages to be sent. For example, a weather alert service may need to send a storm warning alert to many thousands of subscribers at the same time. Opening and closing a network connection between the client composing the alert message for each message may consume an inordinate amount of network, memory, and/or processor resources and result in delays in delivery. Consistent with embodiments of the invention, a single file comprising multiple messages to one or more recipients may be provided to a server in a single transaction. Using an extensible markup language (XML) schema may allow an efficient transmission of message contents and routing instructions. This message bundling may be used in conjunction with and/or separately from the client/server text message handshaking described throughout this specification.

Figure 1:
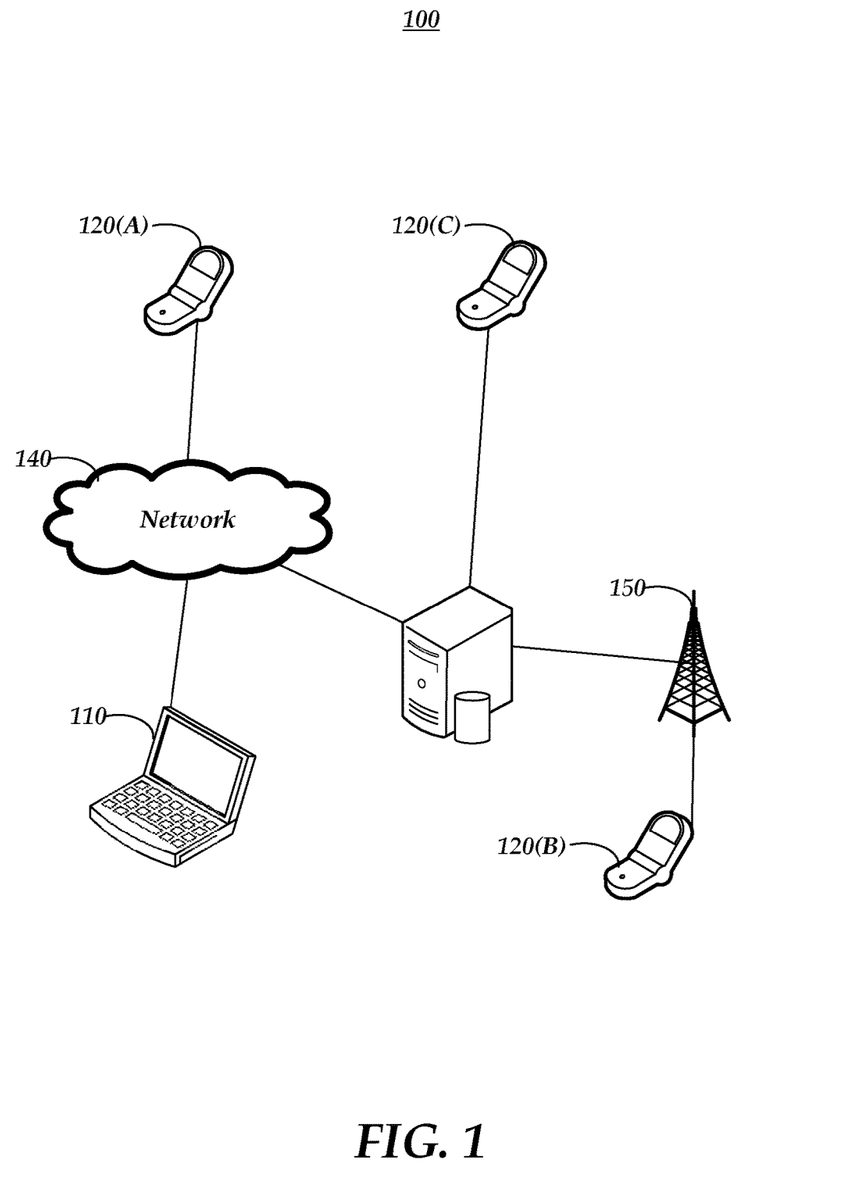
FIG. 1 is a block diagram of an operating environment.

FIG. 1 is a block diagram of an operating environment 100 for providing message handshaking and integration. Operating environment 100 may comprise a client device 110, a plurality of receiving devices 120(A)-120(C), and a server 130. Client device 110, plurality of receiving devices 120(A)-120(C), and server 130 may be communicatively coupled via a network 140, such as the Internet. One or more of receiving devices 120(A)-120(C) may be in communication with client device 110 and/or server 130 via a mobile carrier network 150. Mobile carrier network 150 may comprise a commercial cellular network such as that operated by Sprint, AT&T, and/or Verizon. Client device 110 may comprise, for example, a cellular phone operative to compose e-mail messages and/or text messages. Consistent with embodiments of the invention, client device 110 may comprise a computer such as a laptop, desktop, server, smart phone, and/or tablet computing device. Client device 110 may comprise a processor operative to execute an e-mail client application. Server 130 may comprise a computer operative to execute an e-mail server software application, such as Microsoft EXCHANGE®, produced and distributed by Microsoft Corporation of Redmond, Wash.

Figure 2:
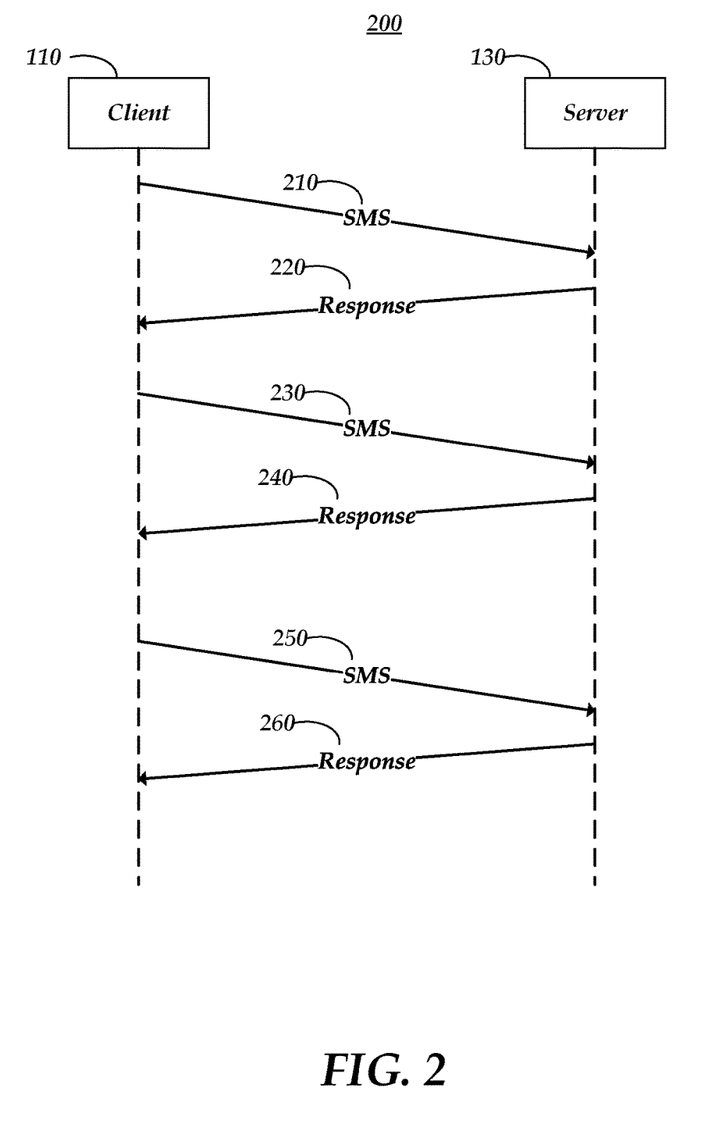
FIG. 2 is a timing diagram of a conventional system for delivering multiple text messages.

FIG. 2 is a first timing diagram 200 of a conventional system for delivering multiple text messages. First timing diagram 200 comprises client device 110 in communication with server 130, such as over network 140. At stage 210, client device 110 may prepare and send a first text message to server 130 for delivery. Server 130 may deliver the message and provide a response to client device 110 at stage 220. At stage 230, client device 110 may prepare and send a second text message to server 130 for delivery. Server 130 may deliver the second message and provide a response to client device 110 at stage 240. At stage 250, client device 110 may prepare and send a third text message to server 130 for delivery. Server 130 may deliver the third message and provide a response to client device 110 at stage 260. This process may repeat for each message that may need to be delivered.

Figure 3A:
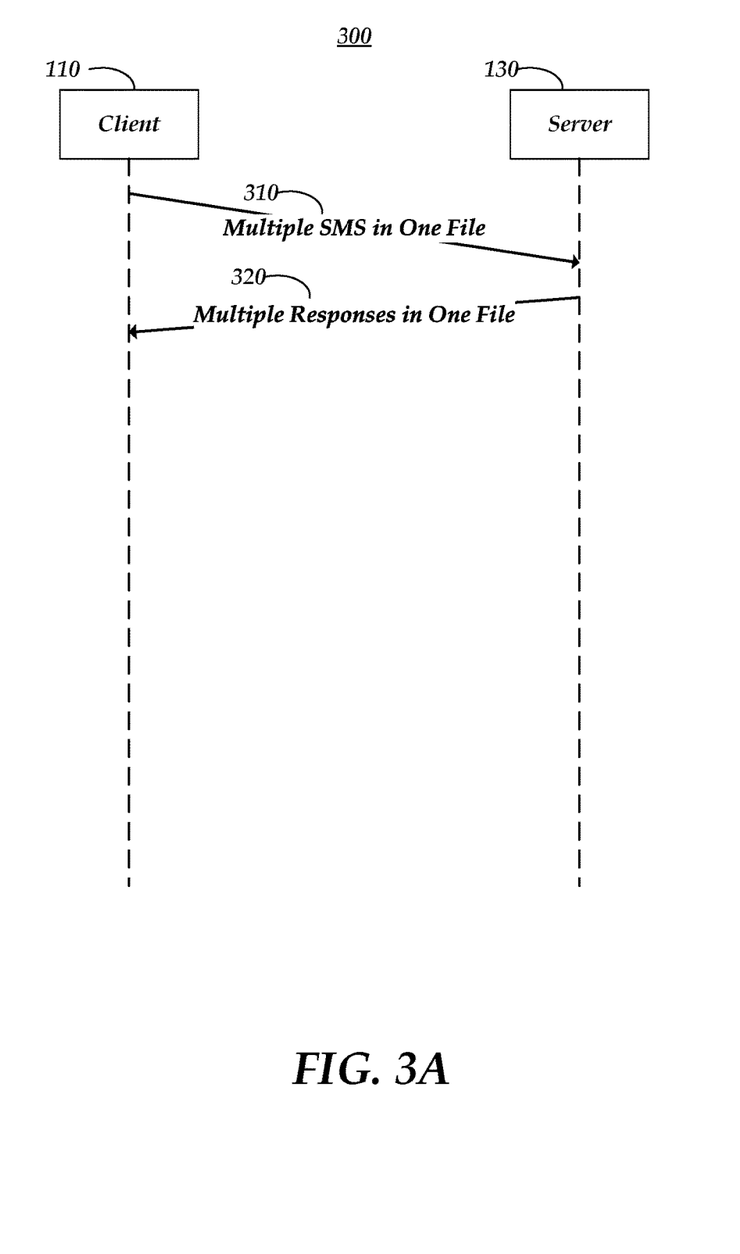
FIG. 3A is a timing diagram for an integrated delivery of several text messages.

FIG. 3A is a second timing diagram 300 for an integrated delivery of several text messages. Second timing diagram 300 may also comprise client device 110 in communication with server 130, such as over network 140. In second timing diagram 300, client device 110 may bundle a plurality of SMS messages into a single file. At stage 310, client device 110 may open a network connection to server 130 and provide the file in a single transaction. Server 130 may process the file and may attempt deliver each of the included messages. After processing the file, server 130 may compose a response file comprising the result of each message's delivery attempt and return it to client device 110 at stage 320. For example, if the file from client device 110 comprised 100 messages to be delivered to 100 different recipients but only 90 of the messages were successfully delivered, the response file from server 130 may comprise an enumerated list of which messages were and/or were not successfully delivered.

FIG. 3B shows an example XML file that may be used to enumerate the messages for delivery in the file provided by client device 110. Consistent with embodiments of the invention, by using XML to enumerate each operation (e.g., with the <xmsData> tag shown in FIG. 3B), a single message may be associated with multiple recipients and/or multiple messages may be associated with a single recipient. This may accommodate the complexity of representing different scenarios. For example, the two different messages may need to be sent to one and three different users respectively. By placing each recipient within a <recipient> tag and each message within a <content> tag, both within the <xmsData> tag, multiple messages may be associated with multiple recipients for delivery without needing to repeat the messages multiple times.

TABLE 1

<?xml verison="1.0" encoding="utf-16"?>
<BatchData BatchID="GUID">
<xmsData ID="INT" client="Mail Client v1.1" xmlns = "http://schemas.mircosoft.com/office/Outlook/2006/OMS">

TABLE 1-continued

<user>
  <userId>myname</userId>
  <password>mypwd</password>
  <replyPhone>12125551234</replyPhone>
  <customData/>
</user>
<xmsHead>
  <scheduled>2005-04-20T14:20:00Z</scheduled>
  <requiredService>SMS_SENDER</requiredService>
  <to>
    <recipient>135xxxx</recipient>
    <recipient>139xxxx</recipient>
  </to>
</xmsHead>
<xmsBody format="SMS">
  <content contentType="text/plain"
contentId="Att0.txt@AB1B43B2B0594564.B94EF7ABB12B49BA"
      contentLocation="1.txt">(1/2)This is th first SMS message...</content>
  <content contentType="text/plain"
contentId="Att1.txt@AB1B43B2B0594564.B94EF7ABB12B49BA"
      contentLocation="2.txt">(2/2)This is th second SMS message...</content>
</xmsBody>
</xmsData>
<xmsData ID="INT" client=" Mail Client v1.1" xmlns = "http://schemas.mircosoft.com/office/Outlook/2006/OMS">
<user>
  <userId>myname</userId>
  <password>mypwd</password>
  <replyPhone>12125551234</replyPhone>
  <customData/>
</user>
<xmsHead>
  <scheduled>2005-04-20T14:20:00Z</scheduled>
  <requiredService>SMS_SENDER</requiredService>
  <to>
    <recipient>140xxxx</recipient>
    <recipient>141xxxx</recipient>
  </to>
</xmsHead>
<xmsBody format="SMS">
  <content contentType="text/plain"
contented="Att0.txt@AB1B43B2B0594564.B94EF7ABB12B49BA"
      contentLocation="1.txt">(1/2)This is th first SMS message...</content>
  <content contentType="text/plain"
contented="Att1.txt@AB1B43B2B0594564.B94EF7ABB12B49BA"
      contentLocation="2.txt">(2/2)This is th second SMS message...</content>
</xmsBody>
</xmsData>
</BatchData>

Figure 4:
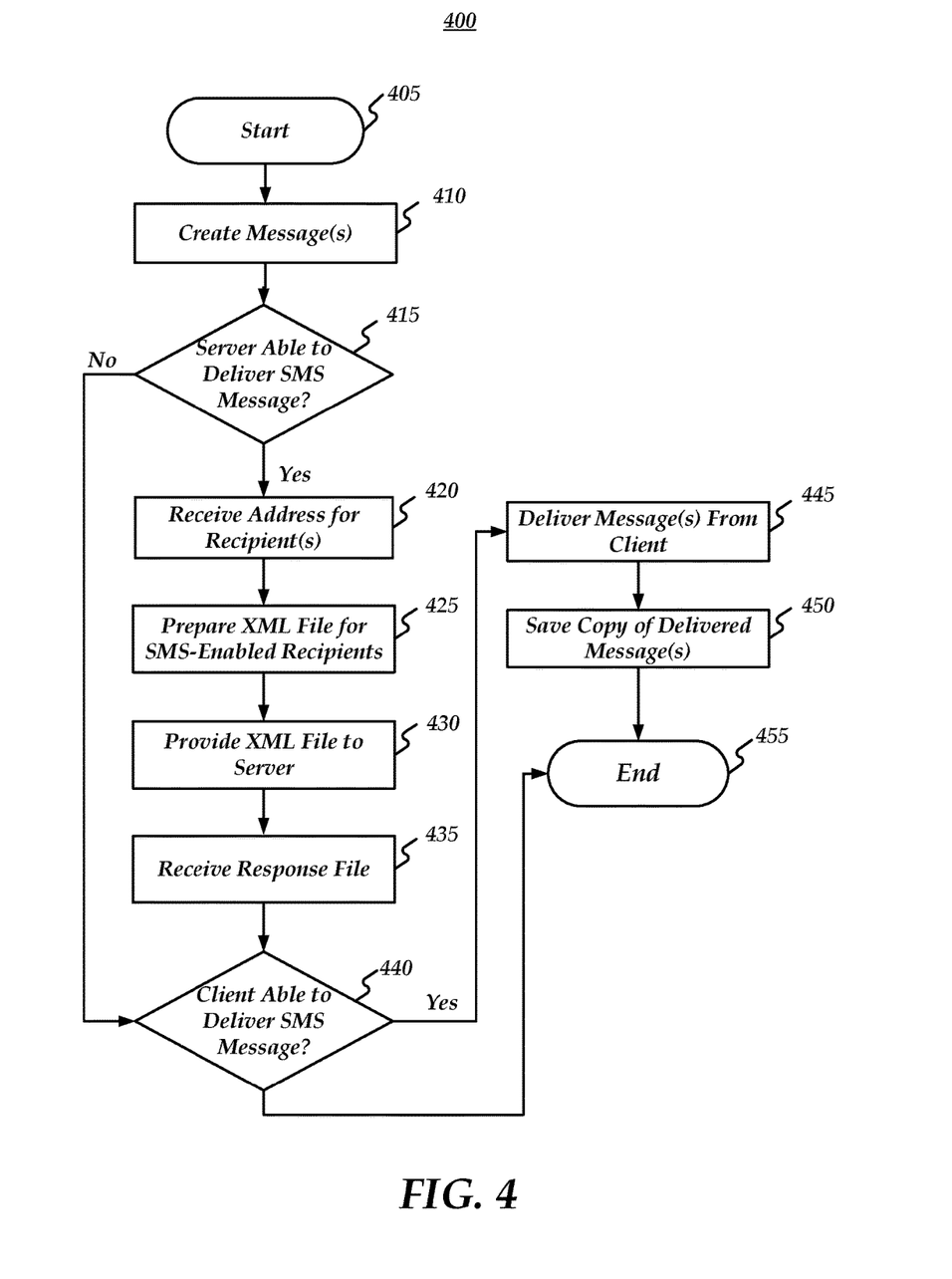
FIG. 4 is a flow chart of a method for providing message handshaking and integration.

FIG. 4 is a flow chart setting forth the general stages involved in a method 400 consistent with an embodiment of the invention for providing message handshaking and integration. Method 400 may be implemented using a computing device 500 as described in more detail below with respect to FIG. 5. Ways to implement the stages of method 400 will be described in greater detail below. Method 400 may begin at starting block 405 and proceed to stage 410 where computing device 500 may create a message in a first format. For example, a user may compose an e-mail message using an e-mail client application on client device 110. Client device 110 may also be operative to create a plurality of message at stage 410, such as an update alert sent to a plurality of recipients associated with a collaborative document when one user makes a change to the document.

From stage 410, method 400 may advance to stage 415 where computing device 500 may determine whether a server is operative to deliver the created message in a text message (e.g., SMS) format. For example, client device 110 may send a query over network 140 to server 130 requesting confirmation that server 130 can deliver the created message via SMS. In response, server 130 may determine whether a recipient of the message is a known user and whether the server has an SMS-compatible address for the recipient.

If, at stage 415, computing device 500 determines that server 130 is capable of delivering the message in the text message format, method 400 may advance to stage 420 where computing device 500 may receive an address for the recipient of the message. For example, server 130 may respond to client device 110 with a mobile based address type for the recipient to indicate that SMS delivery is available. If server 130 is unable to deliver the message in the text message format, it may instead return an error code, return a non-mobile based address type (e.g., an SMTP type address, and/or not return any address type, and method 400 may advance to stage 440, described in greater detail below. Consistent with embodiments of the invention server 130 may return an array of addresses and/or address types in response to client device 110 sending a query regarding multiple recipients. The address returned at stage 420 may comprise a address type to be placed in the message, such as "MOBILE:" that may indicate that the message is intended to be delivered in the text message format.

Method 400 may then advance to stage 425 where computing device 500 may prepare an XML file for text message enabled recipients of the message(s). For example, if multiple messages and/or multiple recipients are associated with the message(s) created at stage 410, client device 110 may create a single XML-based message bundle file comprising information associating the message(s) and/or recipient(s) with the text message based address received at stage 420. Even if only a single message is to be delivered to a single recipient, client device 110 may still prepare the message for delivery to the address of the recipient as an XML file.

From stage 425, method 400 may advance to stage 430 where computing device 500 may provide the XML-based file to the server for processing and delivery of the message(s). For example, client device 110 may send the XML batch file comprising multiple messages to server 130. Server 130 may read the XML batch file and process the address type headers associated with each message to deliver the message to the associated recipient in the desired format. Server 130 may prepare an XML response file comprising a result of the delivery attempt for each message.

From stage 430, method 400 may advance to stage 435 where computing device 500 may receive the response file. For example, client device 110 may receive the XML-based response file from server 130. Method 400 may then advance to stage 440 where computing device 500 may determine whether the message was successfully delivered. For example, client device 110 may open and read the XML-based response file received from server 130 to determine whether a single message and/or each of a plurality of messages were successfully delivered to the desired recipient(s). If the message (or all of the plurality of messages, in the case of multiple messages) was successfully delivered, method 400 may end at stage 455.

Consistent with embodiments of the invention, the response file may indicate the format used to deliver each message. Server 130 may be operative, for example, to retry sending a message in a different format if delivery in the requested format fails. Client device 110 may, however, wish to deliver the message in the requested format. If the response file received at stage 435 indicates that message delivery failed and/or the message was delivered in other than a desired format, method 400 may advance to stage 440 where computing device 500 may determine whether the message can be delivered directly in the desired format. For example, where client device 110 comprises a cellular phone, it may be operative to prepare and send a text message without needing to provide the message to server 130.

Method 400 may thus advance to stage 445 where computing device 500 may deliver the message. For example, client device 110 may attempt to deliver the message directly in the text message format to the associated recipient of the message. Client device 110 may comprise a cellular phone with capability to access a cellular provider's network and transmit the message directly over the cellular network as a text message to the recipient's mobile device, such as receiving device 120(A).

Consistent with embodiments of the invention, server 130 may synchronize directly with a recipient's phone, such as receiving device 120(B). For example, server 130 may use a data synchronization program operative to transport documents, calendars, contact lists and messages between a computer, such as server 130, and a mobile device, such as receiving device 120(B). An example of such a data synchronization program may comprise the ACTIVESYNC EXCHANGE® protocol, developed and distributed by Microsoft Corporation of Redmond, Wash. The text message may then be delivered out to recipient's phone via mobile carrier network 150. Further consistent with embodiments of the invention, server 130 may send the text message as an XML file to a mobile server, hosted by a mobile service provider. The Mobile Service Provider may comprise connections with a plurality of mobile carriers in different parts of the world, and may deliver the text message to the recipient's phone via the recipient's mobile network, such as mobile carrier network 150.

Method 400 may then advance to stage 450 where computing device 500 may save a copy of the delivered message. For example, server 130 and/or client device 110 may save a copy of the delivered to a "sent message" folder of an e-mail application. The saved copy may indicate what format the message was delivered in, along with conventional sent message data such as the date it was sent and the recipient's name. Method 400 may then end at stage 450.

An embodiment consistent with the invention may comprise a system for providing message handshaking and integration. The system may comprise a memory storage and a processing unit coupled to the memory storage. The processing unit may be operative to create a message on a client device in a first format, determine whether a server in communication with the client device is operable to deliver the message in a second format, and, in response to determining that the server in communication with the client device is operable to deliver the message in the second format, provide the message to the server for delivering to at least one recipient.

Another embodiment consistent with the invention may comprise a system for providing message delivery integration. The system may comprise a memory storage and a processing unit coupled to the memory storage. The processing unit may be operative to receive a request to deliver, in a first format, a message created in a second format, determine whether the message can be delivered in the first format;

in response to determining that the message can be delivered in the first format, providing an address associated with at least one recipient, wherein the address comprises a address type associated with the first format, receive the message in the second format, wherein the message in the second format comprises the address associated with the at least one recipient, and deliver the message to the at least one recipient in the first format.

Yet another embodiment consistent with the invention may comprise a system for providing message delivery integration. The system may comprise a memory storage and a processing unit coupled to the memory storage. The processing unit may be operative to create a plurality of messages on a client device in an e-mail format and determine whether a server in communication with the client device is operable to deliver at least one of the plurality of messages in a short message service (SMS) format to the at least one recipient associated with the at least one of the plurality of messages. Being operative to determine whether the server is operable to deliver the message in SMS format may comprise being operative to request the server to evaluate whether each of the plurality of messages can be delivered to the associated at least one recipient in the SMS format and receive an address for each of the recipients for which the server can deliver the associated message and an error code for each of the recipients for which the server cannot deliver the associated message. The system may be further operative to prepare an extensible markup language (XML) enumerated file comprising the address and the message(s) for each of the recipients for which the server can deliver the message(s) in the SMS format, provide the XML enumerated file to the server, and receive an XML enumerated response file from the server comprising a list of delivery results for each of the message(s). The system may be further operative to determine whether the client device can deliver the message(s) in the SMS format to at least one of the recipients for which the server cannot deliver the message(s) in the SMS format and, if so, deliver the message(s). The system may also be operative to save a copy of the delivered message(s) to a sent message folder.

Figure 5:
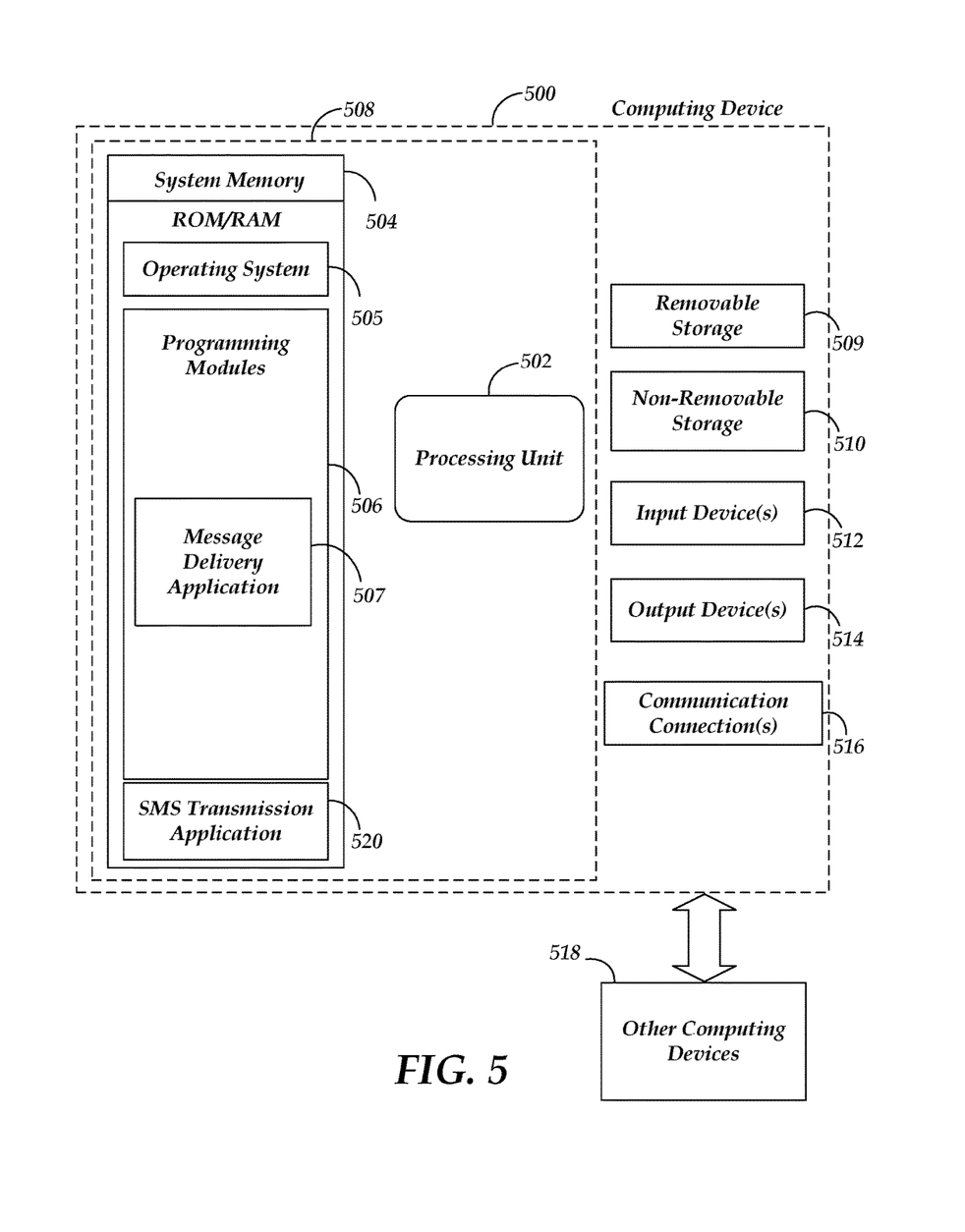
FIG. 5 is a block diagram of a system including a computing device.

FIG. 5 is a block diagram of a system including computing device 500. Consistent with an embodiment of the invention, the aforementioned memory storage and processing unit may be implemented in a computing device, such as computing device 500 of FIG. 5. Any suitable combination of hardware, software, or firmware may be used to implement the memory storage and processing unit. For example, the memory storage and processing unit may be implemented with computing device 500 or any of other computing devices 518, in combination with computing device 500. The aforementioned system, device, and processors are examples and other systems, devices, and processors may comprise the aforementioned memory storage and processing unit, consistent with embodiments of the invention. Furthermore, computing device 500 may comprise a component of operating environment 100 as described above. System 100 may operate in other environments and is not limited to computing device 500.

With reference to FIG. 5, a system consistent with an embodiment of the invention may include a computing device, such as computing device 500. In a basic configuration, computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include operating system 505, one or more programming modules 506, and may include a message delivery application 507. Operating system 505, for example, may be suitable for controlling computing device 500's operation. In one embodiment, programming modules 506 may include an SMS transmission application 520. Furthermore, embodiments of the invention may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer readable instructions, data structures, program modules, or other data. System memory 504, removable storage 509, and non-removable storage 510 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., SMS transmission application 520) may perform processes including, for example, one or more of method 400's stages as described above. The aforementioned process is an example, and processing unit 502 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computing device comprising:
   a processor; and
   a memory storage device including instructions that when executed by the processor enable the processor to:
   receive from a client, a request to determine whether a message created in a first format can be delivered in a second format, the request comprising an address for a first recipient listed in a first address format;
   determine whether the message can be delivered in the second format, wherein determining whether the message can be delivered in the second format comprises determining whether the address for the first recipient is available in a second address format;
   in response to determining that the message can be delivered in the second format, provide, to the client, the address for the first recipient in the second address format;
   receive, from the client, the message in the first format, wherein the message in the first format includes the address for the first recipient in the second address format;
   create, at the computing device, a version of the message according to the second format by converting the message from the first format to the second format; and
   deliver the message to the first recipient in the second format.

2. The computing device of claim 1, wherein the second format comprises a short message service (SMS) format.

3. The computing device of claim 1, wherein the first format comprises an e-mail format.

4. The computing device of claim 1, wherein the instructions further enable the processor to:
receive the request to deliver the message according to the second format to a plurality of recipients;
determine, for each recipient of the plurality of recipients, whether the message can be delivered in the second format; and
provide an array of addresses to the client, wherein each address of the array of addresses is associated with one recipient of the plurality of recipients and wherein each address of the array of addresses specifies a particular format selected from the first format and the second format in which the message can be delivered to an associated recipient.

5. The computing device of claim 4, wherein the instructions further enable the processor to:
receive a file comprising the array of addresses from the client and the message in the first format to be delivered to each recipient of the plurality of recipients in the particular format indicated in the array of addresses associated with each recipient of the plurality of recipients.

6. The computing device of claim 5, wherein at least one recipient of the plurality of recipients is to receive the message in a different format from at least one other recipient of the plurality of recipients.

7. The computing device of claim 5, wherein the instructions further enable the processor to:
determine, for each recipient of the plurality of recipients, whether the message was successfully delivered; and
provide, to the client, a result file comprising an XML-enumerated list of whether the message was successfully delivered to each recipient of the plurality of recipients.

8. The computing device of claim 1, wherein determining whether the message can be delivered in the second format comprises determining whether the address for the first recipient is available in a format comprising a short message service (SMS) compatible address for the first recipient.

9. The computing device of claim 1, wherein the instructions further enable the processor to:
in response to determining that the message cannot be delivered in the second format, signal the client to handle delivery of the message to the first recipient, wherein the client is signaled to create the version of the message according to the second format and to deliver the message to the first recipient in the second format without the computing device receiving the message.

10. The computing device of claim 1, wherein the message received from the client is further addressed to a second recipient and includes a second address for the second recipient that is listed in the first address format, wherein the instructions further enable the processor to deliver the message to the second recipient in the first format.

11. The computing device of claim 1, wherein the message received from the client is bundled according to a schema with a plurality of other messages intended for a plurality of other recipients.

12. A computer-readable storage device including processor-executable instructions for providing message delivery integration, the comprising:
receiving, from a client, a request to determine whether a message created in a first format can be delivered in a second format, the request comprising an address for a first recipient listed in a first address format;
determining whether the message can be delivered in the second format, wherein determining whether the message can be delivered in the second format comprises determining whether the address for the first recipient is available in a second address format;
in response to determining that the message cannot be delivered in the second format, providing to the client, an error message indicating the message cannot be delivered in the second format; and
in response to determining that the message can be delivered in the second format, providing to the client, the address for the first recipient in the first second address format;
receiving the message in the first format, wherein the message in the first format includes the address for the first recipient in the second address format;
creating a version of the message according to the second format by converting the message from the first format to the second format; and
delivering the message to the first recipient in the second format.

13. The computer-readable storage device of claim 12, further comprising:
determining whether the message was successfully delivered; and
providing an indication, to the client, of whether the message was successfully delivered.

14. A method for providing message delivery integration, the method executed by the set of instructions comprising:
receiving, from a client, a request to determine whether a message created in a first format can be delivered in a second format, the request comprising first address for a first recipient listed according to the first format;
determining whether the message can be delivered in the second format, wherein determining whether the message can be delivered in the second format comprises determining whether a second address is available for the first recipient, wherein the second address is listed according to the second format;
in response to determining that the message can be delivered in the first second format, providing, to the client, the second address;
receiving, from the client, the message in the first format, wherein the message in the second format includes the second address;
converting the message received in the first format into the second format; and
delivering the message to the first recipient in the second format.

15. The method of claim 14, wherein the second format comprises a short message service (SMS) format.

16. The method of claim 14, wherein the first format comprises an e-mail format.

17. The method of claim 14, further comprising:
receiving the request to deliver the message to a plurality of recipients according to the second format;
determining, for each recipient of the plurality of recipients, whether the message can be delivered in the second format; and
providing an array of addresses to the client, wherein each address of the array of addresses is associated with one recipient of the plurality of recipients and wherein each address of the array of addresses specifies a particular format selected from the first format and the second format in which the message can be delivered to an associated recipient.

18. The method of claim 17, further comprising:
receiving a file comprising the array of addresses from the client and the message in the first format to be delivered to each recipient of the plurality of recipients in the particular format indicated in the array of addresses associated with each recipient of the plurality of recipients.

19. The method of claim 18, wherein each recipient of the plurality of recipients is to receive the message in one format.

20. The method of claim 18, wherein the file comprises the array of addresses enumerated using extensible markup language (XML).

* * * * *